(12) United States Patent
Yoshikawa et al.

(10) Patent No.: US 9,026,298 B2
(45) Date of Patent: May 5, 2015

(54) CONTROL APPARATUS FOR HYBRID VEHICLE

(71) Applicant: Toyota Jidosha Kabushiki Kaisha, Toyota-shi, Aichi (JP)

(72) Inventors: Masato Yoshikawa, Toyota (JP); Shintaro Matsutani, Toyota (JP)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 14/150,293

(22) Filed: Jan. 8, 2014

(65) Prior Publication Data
US 2014/0195086 A1  Jul. 10, 2014

Related U.S. Application Data

(60) Provisional application No. 61/750,109, filed on Jan. 8, 2013.

(51) Int. Cl.
| | |
|---|---|
| *B60W 10/02* | (2006.01) |
| *B60W 10/08* | (2006.01) |
| *B60W 10/06* | (2006.01) |
| *B60W 20/00* | (2006.01) |
| *B60W 10/115* | (2012.01) |
| *B60W 30/19* | (2012.01) |

(52) U.S. Cl.
CPC ............... *B60W 20/40* (2013.01); *B60W 10/02* (2013.01); *B60W 10/06* (2013.01); *B60W 10/08* (2013.01); *Y10S 903/93* (2013.01); *B60W 10/115* (2013.01); *B60W 30/19* (2013.01); *Y02T 10/6286* (2013.01)

(58) Field of Classification Search
CPC ..... B60W 20/40; B60W 10/02; B60W 10/60; B60W 10/08; B60W 10/06; B60W 10/115; B60W 30/19; Y01S 903/93

USPC ......................... 701/22; 180/65.265; 903/930
See application file for complete search history.

(56) References Cited

U.S. PATENT DOCUMENTS 6,404,332 B1 * 6/2002 Wakashiro et al. ........... 340/456
2007/0114082 A1   5/2007 Nozaki et al.
(Continued)

FOREIGN PATENT DOCUMENTS

| JP | 2006306210 A | 11/2006 |
|---|---|---|
| JP | 2007131071 A | 5/2007 |
| JP | 2010167911 A | 8/2010 |

OTHER PUBLICATIONS

Machine Translation of Japanese Publication No. 2006-306210 A; Published Nov. 9, 2006.
(Continued)

*Primary Examiner* — Mary Cheung
*Assistant Examiner* — Frederick Brushaber
(74) *Attorney, Agent, or Firm* — Dinsmore & Shohl LLP

(57) ABSTRACT

A control apparatus for a hybrid vehicle is provided with an engine, an electric motor, a clutch disposed in a power transmitting path between the engine and the electric motor, and a transmission of a step-variable type disposed in a power transmitting path between said electric motor and drive wheels, a shift position of said transmission to be established after a shift-down action thereof performed in a vehicle drive mode using said electric motor as a drive power source being selected on the basis of an output-related value after starting of said engine, and according to a predetermined relationship, when the starting of said engine is required together with said shift-down action.

9 Claims, 6 Drawing Sheets

(56) References Cited

U.S. PATENT DOCUMENTS

| | | | |
|---|---|---|---|
| 2008/0064560 A1* | 3/2008 | Popp et al. | 477/5 |
| 2008/0076623 A1* | 3/2008 | Tabata et al. | 477/5 |
| 2008/0228363 A1* | 9/2008 | Kouno et al. | 701/54 |
| 2009/0055073 A1* | 2/2009 | Matsubara et al. | 701/102 |
| 2009/0301800 A1* | 12/2009 | Oba et al. | 180/65.25 |
| 2010/0012407 A1* | 1/2010 | Oba et al. | 180/65.23 |
| 2010/0018789 A1* | 1/2010 | Oba et al. | 180/65.235 |
| 2010/0038157 A1* | 2/2010 | Oba et al. | 180/65.235 |
| 2010/0051360 A1* | 3/2010 | Oba et al. | 180/65.22 |
| 2011/0021311 A1* | 1/2011 | Kim et al. | 477/3 |

OTHER PUBLICATIONS

Machine Translation of Japanese Publication No. 2010-167911 A; Published Aug. 5, 2010.

* cited by examiner

|  | C1 | C2 | B1 | B2 | F1 | SPEED RATIO |
|---|---|---|---|---|---|---|
| 1st | O |  |  | (O) | O | 3.20 |
| 2nd | O |  | O |  |  | 1.72 |
| 3rd | O | O |  |  |  | 1.00 |
| 4th |  | O | O |  |  | 0.67 |
| R | O |  |  | O |  | 3.20 |
| N |  |  |  |  |  |  |

O : ENGAGED

CONTROL APPARATUS FOR HYBRID VEHICLE

CROSS REFERENCE TO RELATED APPLICATIONS

The present specification claims priority to U.S. Provisional Patent Application Ser. No. 61/750,109 filed Jan. 8, 2013 and entitled "CONTROL DEVICE FOR HYBRID VEHICLE," the entirety of which is incorporated by reference herein.

TECHNICAL FIELD

The present specification relates to a control apparatus for a hybrid vehicle provided with a clutch disposed in a power transmitting path between an engine and an electric motor, and more particularly to an improvement for reducing deterioration of drivability of the hybrid vehicle upon starting of the engine in a vehicle drive mode exclusively using the electric motor as a drive power source.

BACKGROUND

There is known a drive system for a hybrid vehicle, which is provided with an engine, an electric motor, a clutch disposed in a power transmitting path between the engine and the electric motor, and a transmission of a step-variable type disposed in a power transmitting path between the electric motor and drive wheels. In the field of such type of hybrid vehicle drive system, there has been proposed a technique to improve an acceleration response to an operation of an accelerator pedal. For example, Patent Document 1 discloses a method of starting the engine of the hybrid vehicle drive system.

PRIOR ART DOCUMENTS

Patent Documents

Patent Document 1: JP-2006-306210 A
Patent Document 2: JP-2010-167911 A
Patent Document 3: JP-2007-131071 A

SUMMARY

The conventional hybrid vehicle drive system described above suffers from generation of a shock upon starting of the engine in a vehicle drive mode exclusively using the electric motor as a drive power source. To reduce this shock, it is necessary to engage the clutch when a difference between the operating speed of the engine after starting and an input speed of the transmission has been minimized. When the difference between the operating speed of the engine after starting and the input speed of the transmission is comparatively large, for example, when the operating speed of the engine becomes considerably greater than the input speed of the transmission, due to racing of the engine, a comparatively long length of time is required before the clutch has been brought into its fully engaged state, giving rise to a risk of deterioration of the drivability of the hybrid vehicle. This problem was discovered by the present inventors in the process of continued intensive research in an attempt to improve the performance of the hybrid vehicle.

The embodiments described herein were made in view of the background described above and provide a control apparatus for a hybrid vehicle, which reduces deterioration of the drivability of the hybrid vehicle upon starting the engine in a vehicle drive mode exclusively using the electric motor as the drive power source.

A first aspect of the present specification provides a control apparatus for a hybrid vehicle provided with an engine, an electric motor, a clutch disposed in a power transmitting path between the engine and the electric motor, and a transmission of a step-variable type disposed in a power transmitting path between the electric motor and drive wheels, characterized in that a shift position of the transmission to be established after a shift-down action thereof performed in a vehicle drive mode using the electric motor as a drive power source is selected on the basis of an output-related value after starting the engine, and according to a predetermined relationship, when starting the engine is required together with the shift-down action.

According to the first aspect, the shift position of the transmission to be established after the shift-down action thereof performed in the vehicle drive mode using the electric motor as the drive power source is selected on the basis of the output-related value after starting the engine, and according to the predetermined relationship, when starting the engine is required together with the shift-down action. Accordingly, the length of time required for changing the vehicle drive mode to a hybrid drive mode can be minimized even when the difference between the operating speed of the engine after starting and the input speed of the transmission is comparatively large. Namely, the present specification provides a control apparatus for the hybrid vehicle, which reduces the deterioration of drivability of the hybrid vehicle upon starting the engine in the vehicle drive mode exclusively using the electric motor as the drive power source.

According to a second aspect of the specification dependent on the first aspect, the shift position of the transmission to be established after the shift-down action is selected so as to minimize a difference between an operating speed of the engine after the start thereof and an input speed of the transmission after the shift-down action. Accordingly, the length of time required for changing the vehicle drive mode to the hybrid drive mode can be minimized in a practically effective manner even when the difference between the operating speed of the engine after starting and the input speed of the transmission is comparatively large.

DETAILED DESCRIPTION

Figure 1:
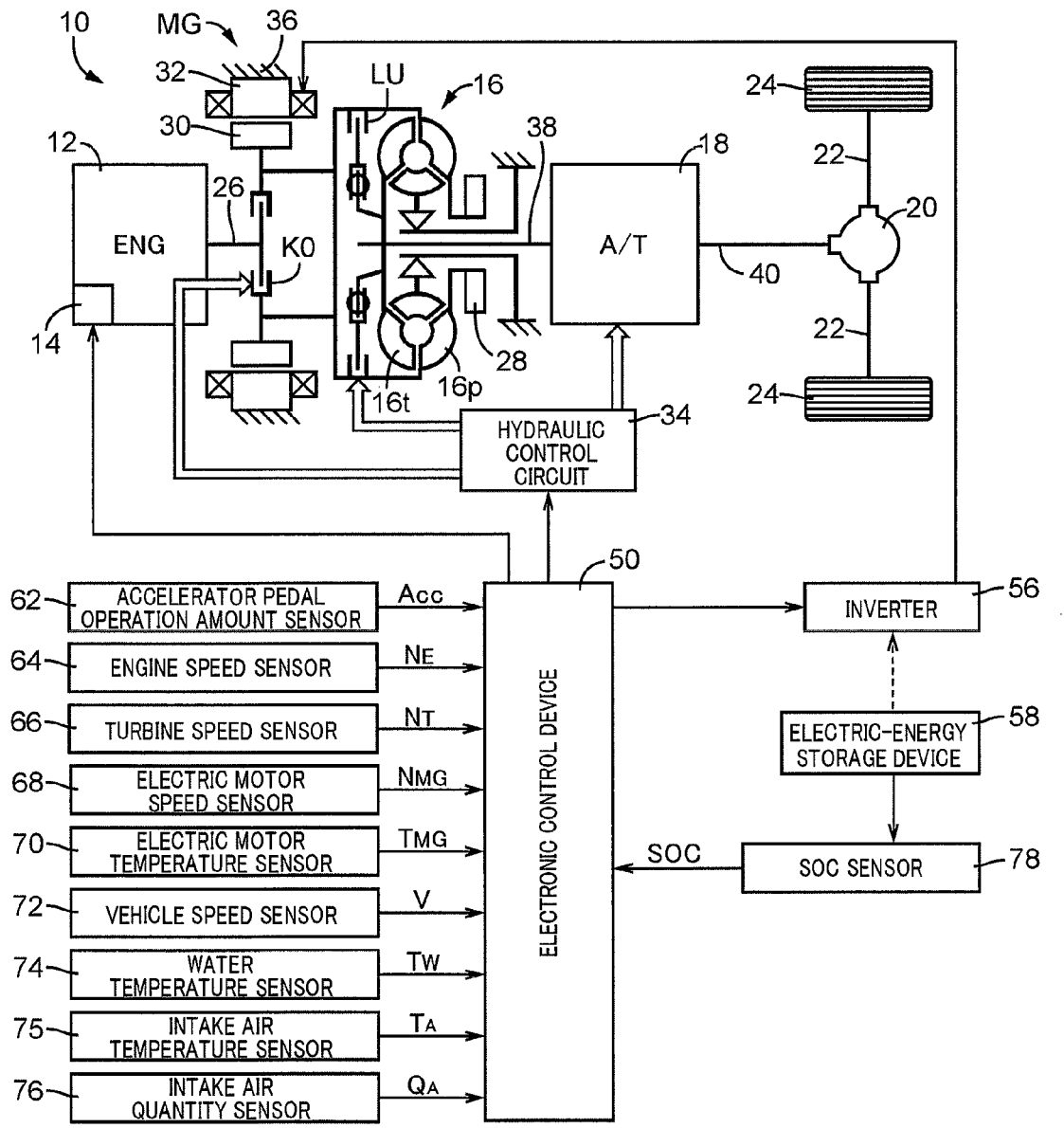
FIG. 1 is a schematic view showing an arrangement of a drive system of a hybrid vehicle to which the present specification is suitably applicable.

In embodiments of the systems and apparatuses described herein, the output-related value after starting the engine of the hybrid vehicle is an amount of racing of the engine after starting, that is, the engine speed after starting. This amount of racing of the engine after starting may be estimated according to a predetermined relationship, and on the basis of a cooling water temperature of the engine or an intake air temperature of the engine, and a target idling speed of the engine. The predetermined relationship is formulated to increase the output-related value after starting the engine, with a decrease of the cooling water temperature of the engine, with a decrease of the intake air temperature of the engine, and with an increase of the target idling speed of the engine.

In another embodiment, shifting lines for shifting the transmission are compensated so that a determination (a request) for the shift-down actions of the transmission will take place at higher vehicle running speeds, when starting the engine and the shift-down action of the transmission are concurrently required in the vehicle drive mode exclusively using the electric motor as the drive power source. In embodiments, the shifting lines are compensated so as to enlarge regions in which the transmission is shifted down to the lower speed gear positions (having the higher speed ratios).

In a further embodiment, the amount of compensation of the shifting lines is calculated on the basis of the output-related value after starting the engine. In embodiments, the amount of compensation of the shifting lines is set so as to increase with an increase of the output-related value after starting the engine. In embodiments, the amount of compensation of the shifting lines is set so as to increase with an increase of a difference between the operating speed of the engine after starting and an input speed of the transmission after the shift-down action.

In another embodiment, the hybrid vehicles to which the control apparatus is suitably applicable are constructed such that a crankshaft of the engine is connected to a rotor of the electric motor through the clutch, and is provided with a torque converter and the transmission which are disposed in a power transmitting path between the rotor and the drive wheels. However, the control apparatus is also applicable to hybrid vehicles in which the transmission is disposed in the power transmitting path between the electric motor and the drive wheels, in the absence of the torque converter.

In a further embodiment, the systems and apparatuses described herein are applicable to a case where the shift position of the transmission is selected as described above, when the transmission is shifted down together with a control to start the engine upon switching of a vehicle drive mode from an EV drive mode exclusively using the electric motor as the drive power source, to an EHV mode (hybrid drive mode) using the engine and the electric motor as the drive power sources.

In another embodiment, starting the engine together with the shift-down action of the transmission is the starting of the engine required or determined to be implemented substantially concurrently with the requirement for performing (determination to perform) the shifting action of the transmission. In this case, however, the starting control of the engine and the shift-down control of the transmission need not be initiated and terminated at the same points of time, provided that those engine starting control and transmission shift-down control at least partially overlap with each other in time.

An exemplary embodiment of the control apparatus will now be described in detail by reference to the drawings. However, it should be understood that other embodiments of the control apparatus are contemplated.

FIG. 1 is a schematic view showing a drive device and a control apparatus of a hybrid vehicle drive system 10 (hereinafter referred to simply as "drive system 10") to which embodiments of the present specification are suitably applicable. As shown in FIG. 1, the drive system 10 of the present example is provided with an engine 12 and an electric motor MG, which function as vehicle drive power sources. Drive forces generated by the engine 12 and the electric motor MG are transmitted to a pair of left and right drive wheels 24 through a torque converter 16, an automatic transmission 18, a differential gear device 20, and a pair of left and right axles 22. The electric motor MG, torque converter 16 and automatic transmission 18 are accommodated in a transmission casing 36 (hereinafter referred to as "casing 36"). This casing 36 is an aluminum split casing formed by die casting and is fixed to a stationary member such as a vehicle body. In the drive system 10 arranged as described above, at least one of the engine 12 and electric motor MG is used as the drive power source for running the hybrid vehicle. Namely, the drive system 10 is configured to selectively establish one of a plurality of vehicle drive modes such as: an engine drive mode in which the engine 12 is exclusively used as the drive power source; an EV drive mode (motor drive mode) in which the electric motor MG is exclusively used as the drive power source; and an EHV drive mode (hybrid drive mode) in which the engine 12 and electric motor MG are used as the drive power sources.

For example, the engine 12 is an internal combustion engine such as a gasoline or diesel engine of a direct injection type in which fuel is directly injected into its combustion chambers. To control an operation (output torque) of the engine 12, there is provided an output control device 14 provided with a throttle actuator for opening and closing an electronic throttle valve, a fuel injecting device for implementing a fuel injection control, an igniting device for implementing an ignition timing control, etc. The output control device 14 is controlled according to commands supplied from an electronic control device 50 (described below) to control the output of the engine 12, by controlling the throttle actuator to open and close the electronic throttle valve, controlling the fuel injecting device to control the injection of the fuel, and controlling the igniting device to control the ignition timing.

Between a pump impeller 16$p$ and a turbine impeller 16$t$ of the torque converter 16, there is provided a lock-up clutch LU configured to connect the pump and turbine impellers 16$p$, 16$t$ directly to each other so that the impellers 16$p$, 16$t$ are rotated as a unit. This lock-up clutch LU is controlled to be placed in one of an engaged state (fully engaged state), a slipping state and a released state (fully released state), according to a hydraulic pressure received from a hydraulic control circuit 34. To the pump impeller 16p of the torque converter 16, there is connected a mechanical oil pump 28 which is operated by a rotary motion of the pump impeller 16p to generate the hydraulic pressure to be applied to and controlled by the hydraulic control circuit 34.

Figures 2, 3:
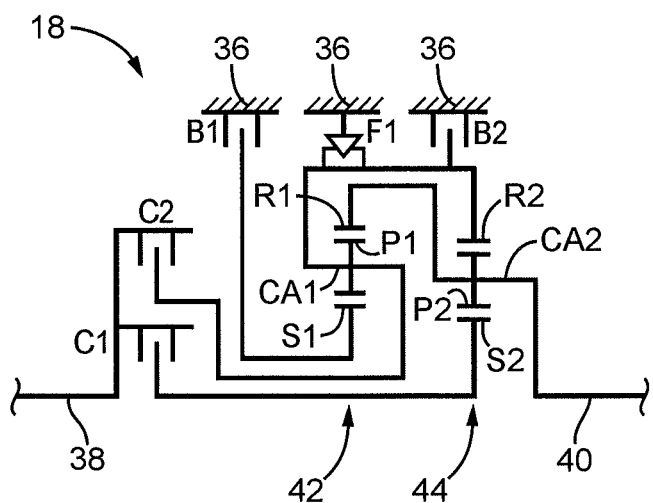
FIG. 2 is a schematic view showing an example of an arrangement of an automatic transmission provided in the hybrid vehicle of FIG. 1.
FIG. 3 is a table indicating combinations of operating states of hydraulically operated frictional coupling devices used to shift the automatic transmission of FIG. 2.

FIG. 2 is a schematic view showing an example of an arrangement of the automatic transmission 18. Since this automatic transmission 18 is symmetrical in construction with respect to its axis, a lower half of the automatic transmission 18 is not shown in the schematic view of FIG. 2. As shown in FIG. 2, the automatic transmission 18 is a step-variable automatic transmission mechanism which is principally constituted by planetary gear sets 42 and 44 of a single-pinion type, for instance, which are disposed in a power transmitting path between an input shaft 38 connected to the turbine impeller 16t of the torque converter 16, and an output shaft 40 connected to the differential gear device 20. The automatic transmission 18 is configured to selectively establish one of a plurality of predetermined shift positions (speed ratios). The planetary gear sets 42, 44 are respectively provided with: sun gears S1 and S2; planetary gears P1 and P2; carriers CA1 and CA2 which support the respective planetary gears P1 and P2 such that the planetary gears P1 and P2 are rotatable about their axes and about an axis of the planetary gear sets 42, 44; and ring gears R1 and R2 meshing with the respective sun gears S1 and S2 through the respective planetary gears P1 and P2.

The automatic transmission 18 is provided with a plurality of hydraulically operated frictional coupling devices which are engaged or released in different combinations to selectively establish the plurality of predetermined shift positions. That is, the automatic transmission 18 is configured such that the sun gear S1 is selectively fixed to the casing 36 through a first brake B1, and such that the carrier CA1 and ring gear R2, which are integrally fixed to each other, are fixed to the casing 36 through a second brake B2, and are permitted by a one-way clutch F1 to rotate relative to the casing 36 in one of the opposite directions but inhibited by the one-way clutch F1 from rotating relative to the casing 36 in the other direction. The automatic transmission 18 is further configured such that the sun gear S2 is selectively connected to the input shaft 38 through a first clutch C1, and such that the carrier CA1 and ring gear R2 integrally fixed to each other are selectively connected to the input shaft 38 through a second clutch C2, while the ring gear R1 and carrier CA2, which are integrally fixed to each other, are fixed to the output shaft 40.

Each of the first clutch C1, second clutch C2, first brake B1 and second brake B2 (hereinafter collectively referred to as "clutches C and brakes B", unless otherwise specified) is a hydraulically operated frictional coupling device that is a coupling element commonly used in a conventional vehicular automatic transmission, which is constituted by a wet multiple-disk type coupling element having a plurality of friction plates superposed on each other and forced against each other by a hydraulic actuator, or by a band brake having one band or two bands which is/are wound on an outer circumferential surface of a rotatable drum and tightened by a hydraulic actuator fixed to its or their one end. Each coupling element is interposed between two members, and arranged to selectively connect those two members to each other.

FIG. 3 is the table indicating the combinations of the operating states of the hydraulically operated frictional coupling devices used to shift the automatic transmission 18. As shown in FIG. 3, the automatic transmission 18 is placed in a first speed gear position "1st" having a highest speed ratio γ1 of about 3.20, for instance, when the first clutch C1 and second brake B2 are placed in the engaged states. When the automatic transmission 18 is shifted down from a second speed gear position (or third speed gear position) to the first speed gear position, the rotary motions of the carrier CA1 and ring gear R2 relative to the casing 36 are inhibited by the one-way clutch F1, so that the second brake B2 need not be engaged. When the first clutch C1 and first brake B1 are placed in the engaged state, the automatic transmission 18 is placed in a second speed gear position "2nd" having a speed ratio γ2 of about 1.72, for instance, which is lower than the speed ratio of the first speed gear position. When the first clutch C1 and second clutch C2 are placed in the engaged state, the automatic transmission 18 is placed in a third speed gear position "3rd" having a speed ratio γ3 of about 1.00, for instance, which is lower than the speed ratio of the second speed gear position. When the second clutch C2 and first brake B1 are placed in the engaged state, the automatic transmission 18 is placed in a fourth speed gear position "4th" having a speed ratio γ4 of about 0.67, for instance, which is lower than the speed ratio of the third speed gear position. When the first clutch C1 and second brake B2 are placed in the engaged state, the automatic transmission 18 is placed in a rear drive gear position (reverse shift position) "R" having a speed ratio γR of about 3.20, for instance. When the first clutch C1, second clutch C2, first brake B1 and second brake B2 are placed in the released state, the automatic transmission 18 is placed in a neutral position "N".

As shown in FIG. 1, the electric motor MG is a motor/generator which is provided with a rotor 30 supported by the casing 36 rotatably about its axis, and a stator 32 integrally fixed to the casing 36 radially outwardly of the rotor 30, and which functions as an electric motor which generates a drive force, and an electric generator which generates a reaction force. This electric motor MG is connected through an inverter 56 to an electric energy storage device 58 such as a battery or capacitor, and an operation of the electric motor MG is controlled by the electronic control device 50 described below, which regulates an amount of a drive current to be applied through the inverter 56 to a coil of the electric motor MG. In other words, the output torque of the electric motor MG is increased and reduced through the inverter 56.

In a power transmitting path between the engine 12 and electric motor MG, there is disposed a clutch K0 to control transmission of power through that power transmitting path depending upon its operating state. Namely, an output member of the engine 12 in the form of a crankshaft 26 is selectively connected to the rotor 30 of the electric motor MG through the clutch K0. The rotor 30 of the electric motor MG is fixed to an input member of the torque converter 16 in the form of a front cover. For example, the clutch K0 is a hydraulically operated frictional coupling device of a multiple-disk type which is operated by a hydraulic actuator, that is, selectively placed in one of an engaged state (fully engaged state), a slipping state and a released state (fully released state) according to the hydraulic pressure received from the hydraulic control circuit 34. That is, a torque capacity of the clutch K0 is controlled according to the hydraulic pressure received from the hydraulic control circuit 34. A power transmitting path between the crankshaft 26 and the front cover of the torque converter 16 is placed in a power transmitting state (connected state) when the clutch K0 is placed in the engaged state, and in a power cut-off state when the clutch K0 is placed in the released state. When the clutch K0 is placed in the slipping state, the state of power transmission through the power transmitting path between the crankshaft 26 and the front cover of the torque converter 16 varies with the torque capacity of the clutch K0 (changes with the torque transmitted through the clutch K0).

The drive system 10 is provided with the control system shown in FIG. 1. The electronic control device 50 shown in FIG. 1 includes a so-called microcomputer incorporating a CPU, a RAM, a ROM and an input-output interface. The CPU performs signal processing operations according to programs stored in the ROM, while utilizing a temporary data storage function of the RAM, to implement various controls such as an operating control of the engine 12, an operating control of the electric motor MG, a shifting control of the automatic transmission 18, an engaging force control of the clutch K0, and an engaging control of the lock-up clutch LU. This electronic control device 50 is constituted by a plurality of control units, as needed, such as a unit for controlling the engine 12, a unit for controlling the electric motor MG, and a unit for controlling the automatic transmission 18. These control units may be configured to implement respective control operations, while effecting mutual communications. In this embodiment, the electronic control device 50 corresponds to a control apparatus for the hybrid vehicle (drive system 10).

As indicated in FIG. 1, the electronic control device 50 receives various input signals generated by respective sensors provided in the drive system 10, such as: an output signal of an accelerator pedal operation amount sensor 62 indicative of an operation amount $A_{cc}$ of an accelerator pedal (not shown); an output signal of an engine speed sensor 64 indicative of an operating speed $N_E$ of the engine 12 (engine speed $N_E$); an output signal of a turbine speed sensor 66 indicative of a rotating speed $N_T$ of the turbine impeller 16t of the torque converter 16 (turbine speed $N_T$); an output signal of an electric motor speed sensor 68 indicative of an operating speed $N_{MG}$ of the electric motor MG (electric motor speed $N_{MG}$); an output signal of an electric motor temperature sensor 70 indicative of a temperature TMG of the electric motor MG; an output signal of a vehicle speed sensor 72 indicative of a vehicle running speed V; an output signal of a water temperature sensor 74 indicative of a cooling water temperature $T_W$ of the engine 12; an output signal of an intake air temperature sensor 75 indicative of an intake air temperature $T_A$ of the engine 12; an output signal of an intake air quantity sensor 76 indicative of an intake air quantity $Q_A$ of the engine 12; and an output signal of an SOC sensor 78 indicative of a stored electric energy amount (residual energy amount or charging amount) SOC of the electric energy storage device 58.

The electronic control device 50 generates various signals to be applied to respective devices provided in the drive system 10, such as: signals to be applied to the output control device 14 for the engine 12, to control the operation of the engine 12; a signal to be applied to the inverter 56, to control the operation of the electric motor MG; signals to be applied to a plurality of electromagnetic control valves provided in the hydraulic control circuit 34, to control the shifting actions of the automatic transmission 18; a signal to be applied to a linear solenoid valve provided in the hydraulic control circuit 34 to control the engaging action of the clutch K0; a signal to be applied to a linear solenoid valve provided in the hydraulic control circuit 34 to control the engaging action of the lock-up clutch LU; and a signal to be applied to a linear solenoid valve provided in the hydraulic control circuit 34 to control a line pressure.

Figure 4:
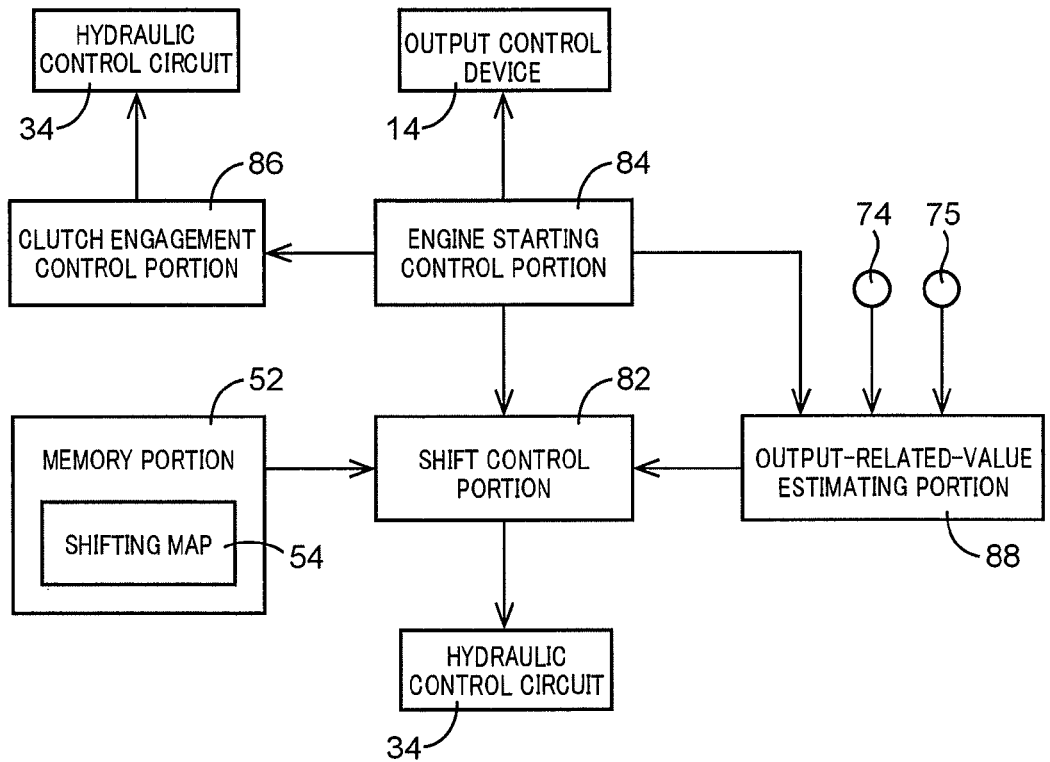
FIG. 4 is a functional block diagram depicting the major control functions of an electronic control device of the hybrid vehicle of FIG. 1.

FIG. 4 is the functional block diagram for explaining major control functions of the electronic control device 50. While these control functions are performed by respective control portions functionally incorporated in the electronic control device 50 shown in FIG. 4, the control portions may be discrete control units which effect mutual communications to perform the various control functions which will be described in detail. A shift control portion 82 shown in FIG. 4 is configured to control the shifting actions of the automatic transmission 18. Namely, the shift control portion 82 is basically configured to determine the shift position (gear position) of the automatic transmission 18 to be established, on the basis of the running condition of the vehicle as represented by the accelerator pedal operation amount $A_{cc}$ detected by the accelerator pedal operation amount sensor 62 and the vehicle running speed V detected by the vehicle speed sensor 72, and according to a predetermined relationship such as a shifting map 54 stored in a memory portion 52, for example. To establish the determined shift position, the shift control portion 82 commands the hydraulic control circuit 34 to engage or release the clutches C and brakes B in the automatic transmission 18. That is, the shift control portion 82 controls the output pressures of the electromagnetic control valves provided in the hydraulic control circuit 34 to control the respective clutches C and brakes B, for controlling the hydraulic pressures to be applied to the respective clutches C and brakes B, to thereby shift the automatic transmission 18 to the determined shift position.

An engine starting control portion 84 is configured to implement an engine starting control for starting the engine 12. For instance, the engine starting control portion 84 starts the engine 12 by engaging the clutch K0, when the vehicle drive mode is changed from the EV drive mode exclusively using the electric motor MG as the drive power source, to the engine drive mode using the engine 12 as the drive power source or the hybrid drive mode. Namely, the engine starting control portion 84 commands a clutch engagement control portion 86 (described below), to place the clutch K0 in its slipping state or fully engaged state, for thereby transmitting a torque to the engine 12 through the clutch K0, to cause a rotary motion of the engine 12, so that the engine operating speed $N_E$ is raised while the engine ignition and fuel supply are initiated under the control of the output control device 14, whereby the engine 12 is started.

Figure 5:
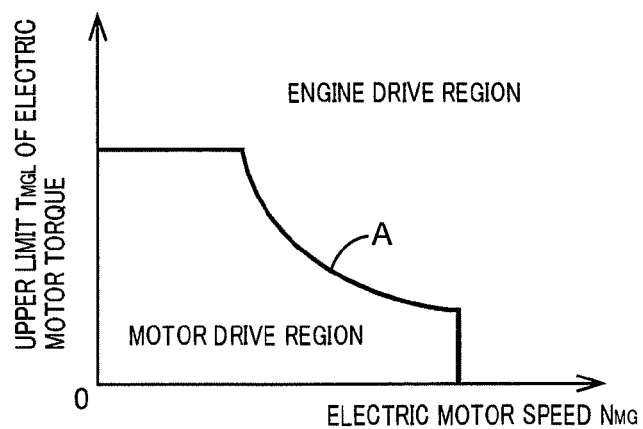
FIG. 5 graphically depicts an example of a relationship used for a determination of switching between a vehicle drive mode exclusively using the electric motor as a drive power source and a vehicle drive mode using the engine as a drive power source, in the hybrid vehicle of FIG. 1.

FIG. 5 graphically depicts an example of a relationship used for switching between the vehicle drive mode exclusively using the electric motor MG as the drive power source and the vehicle drive mode which utilizes the engine 12, in the drive system 10. In the drive system 10, a switching line A for switching between the EV drive mode (motor drive region) exclusively using the electric motor MG as the drive power source and the engine drive mode or hybrid drive mode (engine drive region) for vehicle running with an operation of the engine 12 is defined on the basis of the electric motor speed $N_{MG}$ and an upper limit $T_{MGL}$ of an electric motor torque, as indicated in FIG. 5, and is stored in the memory portion. The engine starting control portion 84 determines, according to the relationship indicated in FIG. 5, whether the vehicle running condition as represented by the electric motor speed $N_{MG}$ detected by the electric motor speed sensor 68 and a required vehicle drive force (required vehicle output torque) lies in the motor drive region or the engine drive region, and implements the engine starting control according to a result of this determination. As is apparent from FIG. 5, the drive system 10 is placed in the motor drive mode, when the output torque is in a comparatively low range in which the engine operating efficiency is generally lower than in a comparatively high range, or when the vehicle running speed V is comparatively low, namely, when the vehicle load is in a low range.

The clutch engagement control portion 86 is configured to implement an engagement control of the clutch K0, through a linear solenoid valve provided in the hydraulic control circuit 34. That is, the clutch engagement control portion 86 controls a command value for the linear solenoid valve (an amount of electric current to be applied to its solenoid coil), for thereby controlling the hydraulic pressure to be applied from the linear solenoid valve to a hydraulic actuator provided for the clutch K0. By this hydraulic pressure control, the clutch K0 is placed in one of the engaged state (fully engaged state), slipping state and released state (fully released state). For example, the clutch engagement control portion 86 implements the clutch engagement control to engage the clutch K0 when the engine starting control portion 84 implements the engine starting control to start the engine 12. By this clutch engagement control by the clutch engagement control portion 86, the torque capacity of the clutch K0 (the torque transmitted through the clutch K0) is controlled according to the hydraulic pressure applied from the linear solenoid valve to the clutch K0. In other words, the clutch engagement control portion 86 is a clutch torque capacity control portion which commands the linear solenoid valve provided in the hydraulic control circuit 34, to control the torque capacity of the clutch K0.

Figure 6:
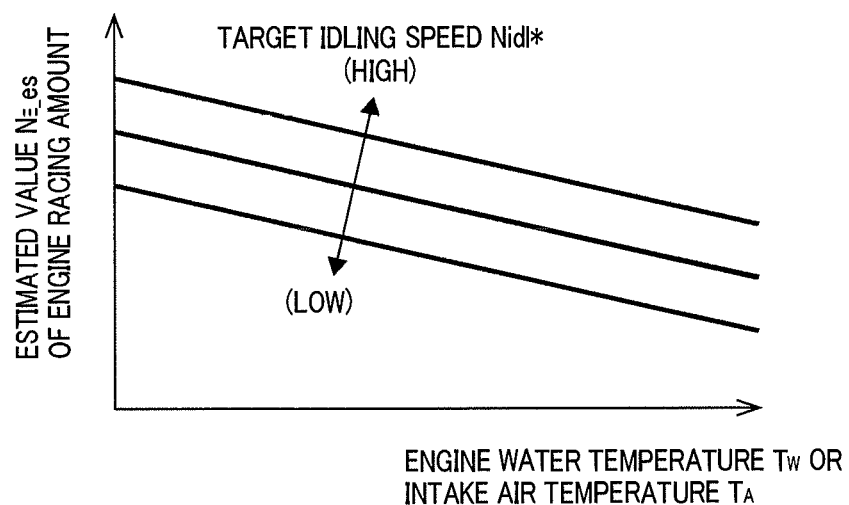
FIG. 6 graphically depicts an example of a relationship used by the electronic control device of FIG. 4 to estimate an amount of racing of the engine after starting.

An output-related-value estimating portion 88 is configured to estimate an output-related value after starting of the engine 12, when the engine starting control portion 84 implements the starting control for starting the engine 12. In embodiments, the output-related-value estimating portion 88 estimates, as the output-related value after starting of the engine 12, an amount of racing of the engine 12 after starting, that is, an engine speed $N_{E\_es}$ after starting. Alternatively, the output-related-value estimating portion 88 may estimate any other value relating to the engine torque or speed, as the output-related value after starting of the engine 12. For instance, the output-related-value estimating portion 88 estimates the engine speed $N_{E\_es}$ after starting the engine 12, according to a predetermined relationship, and on the basis of the cooling water temperature $T_W$ of the engine 12 detected by the water temperature sensor 74 or the intake air temperature $T_A$ of the engine 12 detected by the intake air temperature sensor 75, and a target idling speed Nidl* of the engine 12. FIG. 6 graphically depicts an example of the relationship used by the output-related-value estimating portion 88 to estimate the amount of racing of the engine 12 after starting. It will be understood from FIG. 6 that the relationship is formulated to increase the estimated amount of racing of the engine 12 after starting, with a decrease of the cooling water temperature $T_W$ of the engine 12, with a decrease of the intake air temperature $T_A$ of the engine 12, and with an increase of the target idling speed Nidl* of the engine 12 (at each value of the cooling water temperature $T_W$ or intake air temperature $T_A$). The relationship may be formulated on the basis of an intake air pressure of the engine 12, or an operating state of an optionally provided device such as an air conditioner. In this case, the relationship is formulated to increase the estimated amount of racing of the engine 12 after starting, with an increase of the intake air pressure, or with an increase of a load of the air conditioner, for example.

The shift control portion 82 is configured to select the shift position to be established after a shift-down action of the automatic transmission 18, according to the predetermined relationship, and on the basis of the output-related value after starting the engine 12 estimated by the output-related-value estimating portion 88, when starting the engine 12 by the engine starting control portion 84 and the shift-down action of the automatic transmission 18 are concurrently required in the vehicle drive mode exclusively using the electric motor MG as the drive power source, that is, in the EV drive mode.

The concurrent requirements of starting the engine 12 and the shift-down action of the automatic transmission 18 are interpreted to mean concurrent (substantially simultaneous) implementations of the starting control of the engine 12 and the shift-down control of the automatic transmission 18, such as the requirement for starting (determination to start) the engine 12 and the subsequent requirement for performing (determination to perform) the shift-down action of the automatic transmission 18, which subsequent requirement is made before completion of the engine starting control (for example, before completion of the engaging action of the clutch K0), or the requirement for performing the shift-down action of the automatic transmission 18 and the subsequent requirement for starting the engine 12, which subsequent requirement is made before completion of the shift-down action (for example, before termination of an inertia phase). The concurrent requirements for starting the engine 12 and the shift-down action of the automatic transmission 18 are made when the accelerator pedal operation amount $A_{cc}$ detected by the accelerator pedal operation amount sensor 62 has been increased to or greater than a predetermined threshold value, for example. In other words, when the accelerator pedal operation amount $A_{cc}$ detected by the accelerator pedal operation amount sensor 62 is equal to or greater than the predetermined threshold value, the shift control portion 82 determines that the vehicle operator requires acceleration of the vehicle, even if the determination to perform the shift-down action is not made according to the shifting map 54, and selects the shift position to be established after the shift-down action performed according to the vehicle acceleration requirement, on the basis of the output-related value after starting the engine 12 estimated by the output-related-value estimating portion 88.

In embodiments, the shift control portion 82 may be configured to select the shift position to be established after the shift-down action of the automatic transmission 18, according to the predetermined relationship, and on the basis of the amount of racing of the engine 12 after starting, that is, the engine speed $N_{E\_es}$ after starting estimated by the output-related-value estimating portion 88, when starting the engine 12 and the shift-down action of the automatic transmission 18 are concurrently required in the vehicle drive mode exclusively using the electric motor MG as the drive power source. In embodiments, the shift control portion 82 selects the shift position to be established after the shift-down action performed according to the concurrent requirements, so as to minimize a difference $\Delta N$ ($|N_{E\_es} - N_{IN\_af}|$) between the speed $N_{E\_es}$ of the engine 12 after starting estimated by the output-related-value estimating portion 88, and an input speed $N_{IN\_af}$ of the automatic transmission 18 after the shift-down action. The input speed $N_{IN\_af}$ of the automatic transmission 18 after the shift-down action is calculated on the basis of the vehicle running speed V detected by the vehicle speed sensor 72, and the speed ratio of the shift position to be established after the shift-down action of the automatic transmission 18.

Figure 7:
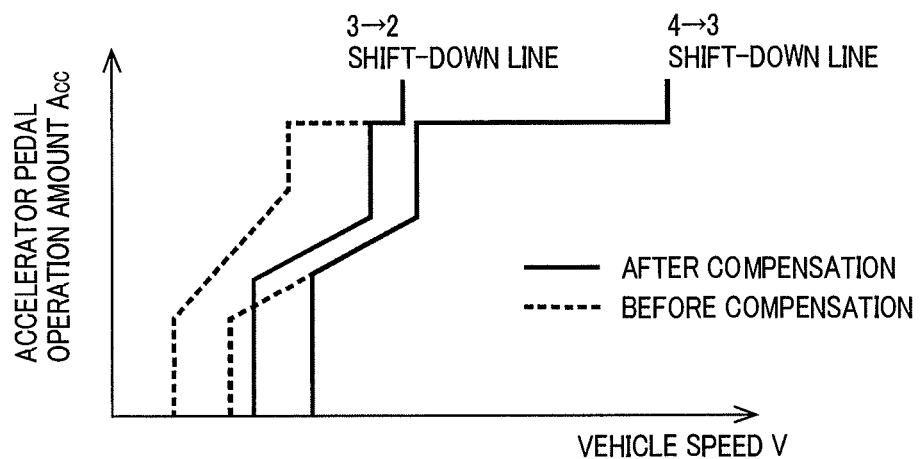
FIG. 7 graphically depicts one scheme for compensation of a shifting map by the electronic control device of FIG. 4, which compensation is implemented when starting the engine and a shift-down action of the automatic transmission are concurrently required.

FIG. 7 graphically depicts an example of compensation of the shifting map 54 by the electronic control device of FIG. 4, which compensation is implemented when starting the engine 12 and the shift-down action of the automatic transmission 18 are concurrently required during operation of the vehicle while the electric motor MG is the sole drive power source. FIG. 7 shows some of the shifting lines of the shifting map 54 stored in the memory portion 52, namely, a 4→3 shift-down line for determining a shifting action of the automatic transmission 18 from the fourth speed gear position "4th" to the third speed gear position "3rd", and a 3→2 shift-down line for determining a shifting action of the automatic transmission 18 from the third speed gear position "3rd" to the second speed gear position "2nd", and further shows examples of compensation of these shift-down lines. As shown in FIG. 7, in some embodiments the shift control portion 82 may be configured to compensate the shifting lines so that a determination (request) for the shift-down actions will take place at higher vehicle running speed V, when starting the engine 12 and a shift-down action of the automatic transmission 18 are concurrently required in the vehicle drive mode exclusively using the electric motor MG as the drive power source. In other words, the shift control portion 82 compensates the shifting lines of the shifting map 54 so as to enlarge the regions in which the automatic transmission 18 is shifted down to the lower speed gear positions (having the higher speed ratios). After the compensation, the shift control portion 82 selects (determines) the shift position to be established after the shift-down action, according to the compensated shifting map 54 (shifting lines), when starting of the engine 12 and the shift-down action of the automatic transmission 18 are concurrently required.

Figure 8:
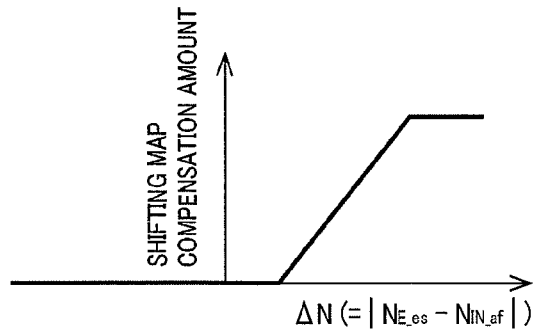
FIG. 8 graphically depicts an example of a relationship used by the electronic control device of FIG. 4 to calculate an amount of compensation of shifting lines.

In embodiments, the shift control portion 82 may be configured to calculate an amount of compensation of the shifting map 54 upon concurrent requirements for starting the engine 12 and the shift-down action of the automatic transmission 18, on the basis of the output-related value after starting the engine 12 estimated by the output-related-value estimating portion 88. In embodiments, the shift control portion 82 calculates the amount of compensation of the shifting map 54 upon the concurrent requirements for starting the engine 12 and the shift-down action of the automatic transmission 18, on the basis of the amount of racing of the engine 12 after starting, that is, the engine speed $N_{E\_es}$ after starting estimated by the output-related-value estimating portion 88. For example, the shift control portion 82 determines the amount of compensation of the shifting map 54 upon the concurrent requirements for starting the engine 12 and the shift-down action of the automatic transmission 18, such that the amount of compensation increases with an increase of the amount of racing of the engine 12 after starting. FIG. 8 graphically depicts an example of the relationship used to calculate the amount of compensation of the shifting lines of the shifting map 54. For example, as shown in FIG. 8, the shift control portion 82 determines the amount of compensation of the shifting map 54 upon concurrent requirements for starting the engine 12 and the shift-down action of the automatic transmission 18, such that the amount of compensation increases with an increase of the difference $\Delta N$ ($|NE_{\_es}-N_{IN\_af}|$) between the speed $N_{E\_es}$ of the engine 12 after starting estimated by the output-related-value estimating portion 88, and the input speed $N_{IN\_af}$ of the automatic transmission 18 after its shift-down action.

Figure 9:
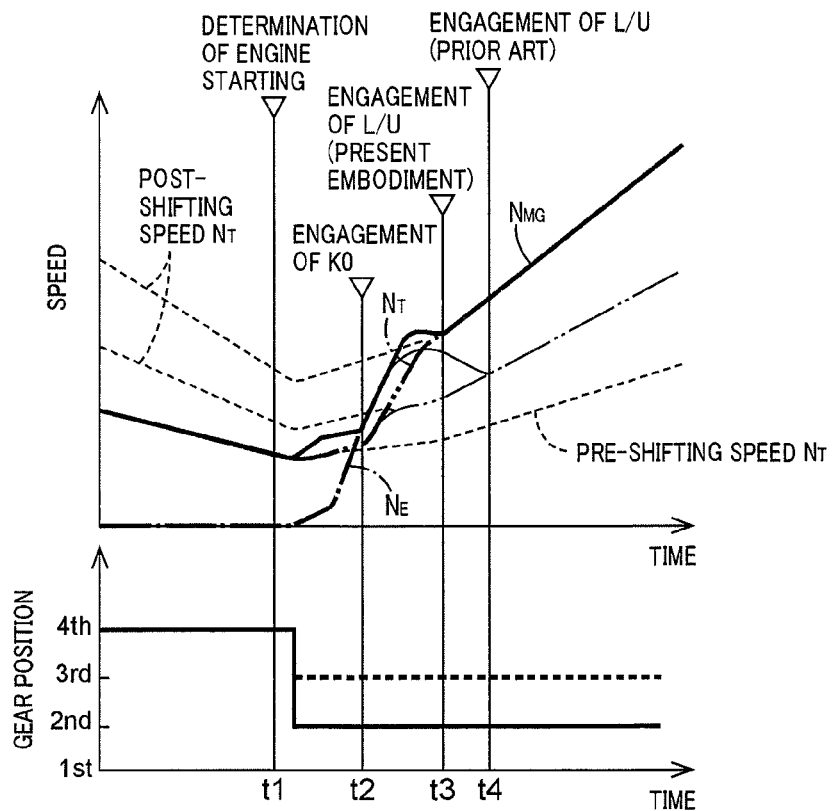
FIG. 9 graphically depicts a time chart for explaining an effect of a control implemented by the electronic control device of FIG. 4 according to one or more embodiments described herein.

FIG. 9 is a time chart graphically depicting an effect of the control implemented by the shift control portion 82, etc. according to the present embodiment. In FIG. 9, a solid line represents the operating speed $N_{MG}$ of the electric motor MG, and a one-dot chain line represents the operating speed $N_E$ of the engine 12, while a two-dot chain line represents the turbine speed $N_T$ corresponding to an input speed $N_{IN}$ of the automatic transmission 18. The thick lines represent the speeds in the case of the control implemented according to the present embodiment, while the thin lines represent the speeds in the case of the control implemented according to the prior art for the purpose of comparison. In the example of FIG. 9, starting the engine 12 is determined (required) in the EV drive mode at a point of time t1, and soon after this point of time t1 the shift-down action of the automatic transmission 18 is determined. Where the engine 12 is started in the EV drive mode, the engine torque immediately after starting is large, and the engine racing may take place with a temporary rise of the engine speed $N_E$. The drive force of the engine 12 can be transmitted to the drive shaft after completion of the engaging action of the clutch K0 at a point of time t2 at which the engine speed $N_E$ is synchronized with the electric motor speed $N_{MG}$. When the engine torque is comparatively large, or when the engine speed NE abruptly rises due to racing, however, there is a risk of generation of a shock in the process of engaging the clutch K0. On the other hand, it is possible to reduce the risk of generation of the shock by placing the lock-up clutch LU of the torque converter 16 in the slipping state, or placing any of the clutches within the automatic transmission 18, for example, the first clutch C1 or second clutch C2 in the slipping state. However, the slipping action of the lock-up clutch LU of the torque converter 16 has a risk of other problems such as heat generation and deterioration of operating efficiency, for instance, while the slipping action of any clutch within the automatic transmission 18 has a risk of other problems such as heat generation by the clutch or a failure to transmit sufficiently the drive force until the engaging action is completed.

According to the control in the present embodiment, on the contrary, the shift position of the automatic transmission 18 to be established after the shift-down action is selected so as to minimize the difference $\Delta N$ ($|N_{E\_es}-N_{IN\_af}|$) between the speed $N_{E\_es}$ of the engine 12 after starting and the input speed $N_{IN\_af}$ of the automatic transmission 18 after its shift-down action. In the example of FIG. 9, the third speed gear position "3rd" is selected as the shift position to be established after the shift-down action (as the shift position to which the automatic transmission 18 is shifted down) as shown with a broken line, according to the control in the prior art, but the second speed gear position "2nd" which is the next lower speed position with respect to the third speed gear position "3rd" is selected as the shift position to be established after the shift-down action, according to the control in the present embodiment, so that the turbine speed $N_T$ can be synchronized with the electric motor speed $N_{MG}$ at an earlier point of time than in the control of the prior art, and the lock-up clutch LU of the torque converter 16 can be restored to its engaged state at an earlier point of time than in the control of the prior art. Namely, the length of time required to place the lock-up clutch LU in the engaged state can be reduced from a length T2 (from the point of time t1 to a point of time t4) in the prior art to a length T1 (from the point of time t1 to a point of time t3). Accordingly, not only the fuel economy of the vehicle can be improved, but also the durability of the clutches of the automatic transmission 18 can be advantageously improved, while the response time of the drive force can be shortened to thereby improve the drivability of the vehicle. Further, the selection of the gear position which is the next lower speed gear position (next lower speed shift position) with respect to the gear position selected in the prior art makes it possible to increase a surplus drive force, which results in an improvement of the drivability response upon further operation of the accelerator pedal. In the control of the present embodiment in which the automatic transmission 18 is shifted substantially concurrently with starting the engine 12, the shock takes place only once, and another shift-down action of the automatic transmission 18 after starting the engine 12 is not necessary, making it possible to ensure a comfortable running of the vehicle.

Figure 10:
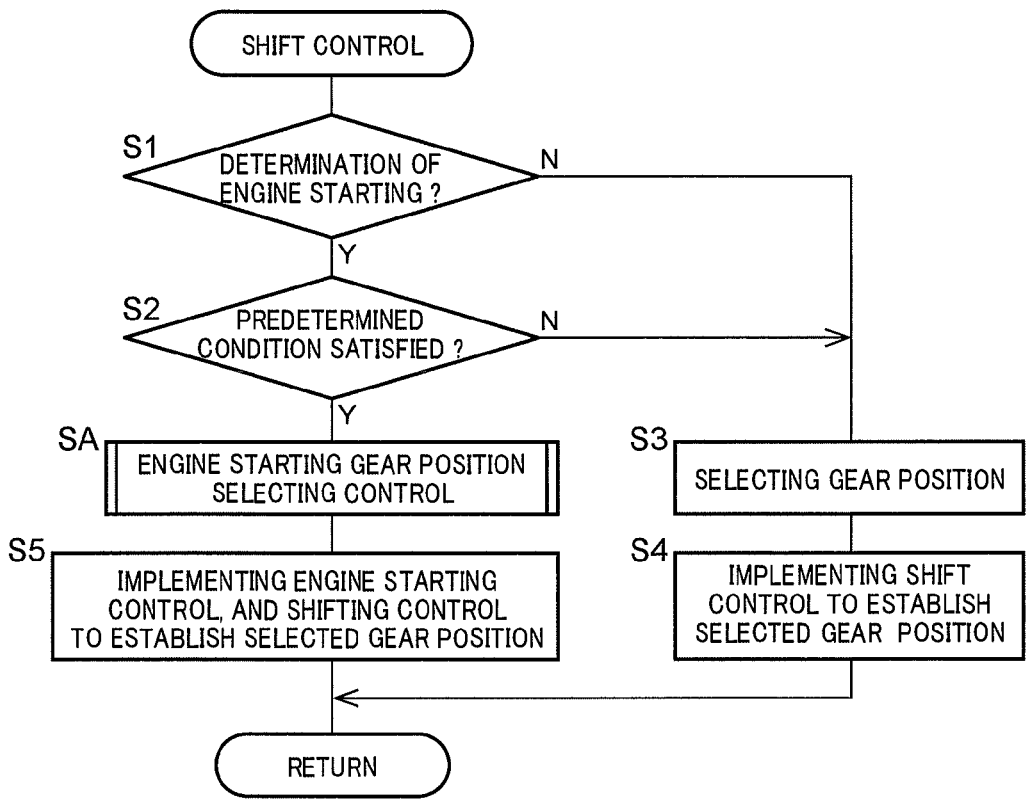
FIG. 10 is a flow chart depicting a major portion of an example of a shifting control of the automatic transmission implemented by the electronic control device of FIG. 4.

FIG. 10 is a flow chart for explaining a major portion of an example of the shifting control of the automatic transmission 18 implemented by the electronic control device 50. A control routine illustrated in the flow chart is repeatedly executed with a predetermined cycle time.

Initially, step S1 (the term "step" being hereinafter omitted) is implemented to determine whether a determination to start (a requirement for starting) the engine 12 is made after the determination to perform (the requirement for performing) a shift-down action of the automatic transmission 18 is made in the EV drive mode exclusively using the electric motor MG as the drive power source. If an affirmative determination is obtained in S1, the control flow goes to S2 and the following steps. If a negative determination is obtained in S1, the control flow goes to S3 to select the gear position (shift position) to be established after the determined shift-down action, according to the shifting map 54 stored in the memory portion 52. The control flow then goes to S4 to implement the shifting control (shift-down control) for shifting the automatic transmission 18 to the gear position selected in S3, if the selected gear position is different from the presently established gear position. The present control routine is terminated after the shifting control. S2 is implemented to determine whether the operating state of the drive system 10 satisfies the predetermined condition, for instance, whether the shift-down action of the automatic transmission 18 takes place substantially concurrently with starting the engine 12 (or whether the accelerator pedal operation amount $A_{cc}$ detected by the accelerator pedal operation amount sensor 62 is equal to or greater than the predetermined threshold value). If a negative determination is obtained in S2, the control flow goes to S3 and the following step. If an affirmative determination is obtained in S2, the control flow goes to SA to implement the engine starting gear position selecting control illustrated in FIG. 11. Then, the control flow goes to S5 to implement the starting control of the engine 12 by implementing the engagement control of the clutch K0, and to implement the shifting control (shift-down control) for shifting the automatic transmission 18 to the gear position selected in SA, if the selected gear position is different from the presently established gear position. The present control routine is terminated after this shifting control.

Figure 11:
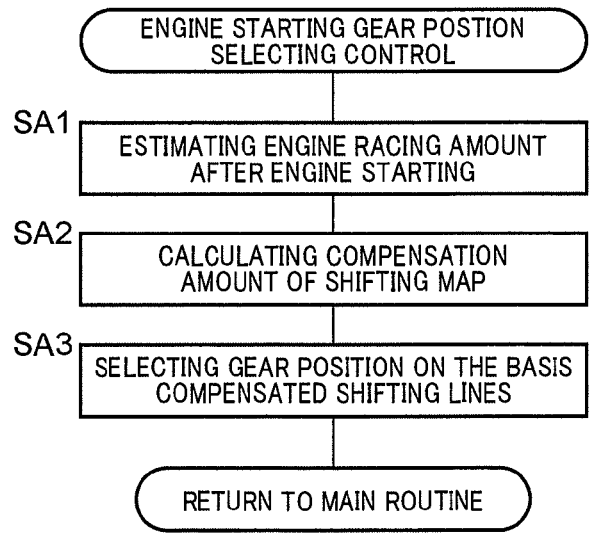
FIG. 11 is a flow chart depicting a major portion of an example of an engine starting gear position selecting control, which is implemented in the shifting control illustrated in FIG. 10.

FIG. 11 is a flow chart for explaining a major portion of an example of the engine starting gear position selecting control in SA, which is implemented in the shifting control illustrated in FIG. 10. In the control illustrated in FIG. 11, SA1 is initially implemented to estimate the amount of racing of the engine 12 after starting, that is, the engine speed $N_{E\_es}$ after starting, according to the predetermined relationship and on the basis of the cooling water temperature $T_W$ or intake air temperature $T_A$ of the engine 12, and the target idling speed Nidl* of the engine 12. The control flow then goes to SA2 to calculate the amount of compensation of the shifting map 54 upon concurrent requirements for starting the engine 12 and the shift-down action of the automatic transmission 18, on the basis of the amount of racing of the engine 12 after its starting estimated in SA1. Then, the control flow goes to SA4 to select the gear position (shift position) to be established after the determined shift-down action, according to the shifting map 54 compensated in SA3, and goes back to the shifting control (main routine) illustrated in FIG. 10. It will be understood that S1-S5, SA2 and SA3 correspond to an operation of the shift control portion 82, while S1 and S5 correspond to an operation of the engine starting control portion 84, and that S5 corresponds to an operation of the clutch engagement control portion 86, while SA1 corresponds to an operation of the output-related-value estimating portion 88.

The present embodiment described above is configured such that the shift position of the automatic transmission 18 to be established after a shift-down action thereof performed in a vehicle drive mode using the electric motor MG as the drive power source is selected on the basis of the output-related value after starting the engine 12, that is, the engine speed $N_{E\_es}$ after starting, and according to the predetermined relationship, when starting the engine 12 is required together with the shift-down action. Accordingly, the length of time required for changing the vehicle drive mode to the hybrid drive mode can be minimized even when the difference between the operating speed of the engine 12 after starting and the input speed of the automatic transmission 18 is comparatively large. Namely, the present embodiment provides the drive system 10 which reduces the deterioration of the drivability of the hybrid vehicle upon starting the engine in the vehicle drive mode exclusively using the electric motor MG as the drive power source.

The shift position to be established after the shift-down action is selected so as to minimize a difference ΔN between the operating speed $N_{E\_es}$ of the engine 12 after the start of the engine 12 and the input speed $N_{IN\_af}$ of the automatic transmission 18 after the shift-down action. Accordingly, the length of time required for changing the vehicle drive mode to the hybrid drive mode can be minimized in a practically effective manner even when the difference between the operating speed of the engine 12 after its starting and the input speed of the automatic transmission 18 is comparatively large.

While embodiments have been described in detail by reference to the drawings, it is to be understood that the embodiments are not limited to the details of the embodiment illustrated in the drawings, and may be embodied with various changes, without departing from the spirit and scope of the subject matter described herein.

The invention claimed is:

1. A hybrid vehicle comprising an engine, an electric motor, a clutch disposed in a power transmitting path between the engine and the electric motor, a transmission of a step-variable type disposed in a power transmitting path between the electric motor and drive wheels, an electronic control device communicatively coupled to the transmission and comprising a processor and a non-transitory memory storing a computer readable and executable instruction set which, when executed by the processor:
   determines if a start of the engine is required concurrently with a shift-down action of the transmission when the hybrid vehicle is in an electric vehicle drive mode;
   calculates an output-related value of the engine when the start of the engine is required concurrently with a shift-down action of the transmission when the hybrid vehicle is in the electric vehicle drive mode, the output-related value relating to at least one of a torque of the engine upon starting and a speed of the engine upon starting;
   determines a shift position of the transmission to be established after the shift-down action is completed on the basis of the output-related value when the start of the engine is required concurrently with the shift-down action of the transmission and the hybrid vehicle is in the electric vehicle drive mode; and
   provides control signals to the transmission to shift the transmission to the determined shift position.

2. The hybrid vehicle according to claim 1, wherein the shift position of the transmission to be established after the shift-down action is determined so as to minimize a difference between an operating speed of the engine after the start thereof and an input speed of the transmission after the shift-down action.

3. The hybrid vehicle according to claim 1 wherein:
the transmission further comprises a hydraulic control circuit operably coupled to the transmission, the hydraulic control circuit comprising electromagnetic control valves;
the electronic control device is communicatively coupled to the electromagnetic control valves; and
the computer readable and executable instruction set, when executed by the processor, controls the electromagnetic control valves of the hydraulic circuit to shift the transmission to the determined shift position.

4. The hybrid vehicle according to claim 1, wherein the output-related value is the speed of the engine at starting.

5. The hybrid vehicle according to claim 4 further comprising:
at least one of a water temperature sensor communicatively coupled to the electronic control device and an intake air temperature sensor communicatively coupled to the electronic control device,
wherein the speed of the engine at starting is determined based on a target idle speed of the engine and at least one of a cooling water temperature of the engine as determined with the water temperature sensor and an intake air temperature of the engine as determined with the intake air temperature sensor.

6. The hybrid vehicle according to claim 1, further comprising:
an accelerator pedal operation amount sensor communicatively coupled to the electronic control device; and
a vehicle speed sensor communicatively coupled to the electronic control device,
wherein the shift position of the transmission to be established after the shift-down action is completed is based on the output-related value, the accelerator operation amount as determined with the accelerator operation amount sensor, the vehicle running speed as determined with the vehicle speed sensor, and a shifting map stored in a memory of the electronic control device.

7. The hybrid vehicle according to claim 1, wherein after calculating the output-related value of the engine and prior to determining a shift position of the transmission, the computer readable and executable instruction set, when executed by the processor, adjusts a shift map stored in a memory of the electronic control device such that shift-down actions occur at higher vehicle running speeds when the start of the engine is required concurrently with the shift-down action of the transmission and the hybrid vehicle is in the electric vehicle drive mode.

8. The hybrid vehicle according to claim 7, wherein the shift map is adjusted based on the output-related value.

9. The hybrid vehicle according to claim 1, further comprising:
an accelerator pedal operation amount sensor communicatively coupled to the electronic control device,
wherein the computer readable and executable instruction set, when executed by the processor, determines a shift-down action request of the transmission based on a comparison between a threshold amount of accelerator pedal operation stored in a memory of the electronic control device and an accelerator pedal operation amount detected by the accelerator pedal operation amount sensor.

* * * * *